United States Patent
Lee

[15] 3,641,456
[45] Feb. 8, 1972

[54] METHOD AND APPARATUS FOR PRODUCING HIGH-POWER SINGLE-FREQUENCY RADIATION

[72] Inventor: Paul H. Lee, Goleta, Calif.
[73] Assignee: The Perkin-Elmer Corporation, Norwalk, Conn.
[22] Filed: Mar. 14, 1969
[21] Appl. No.: 807,245

[52] U.S. Cl............................................331/94.5, 250/199
[51] Int. Cl..........................................H01s 3/10, H01s 3/22
[58] Field of Search................................331/94.5; 250/199

[56] References Cited

UNITED STATES PATENTS 3,321,714   5/1967   Tien........................................331/94.5

Primary Examiner—Ronald L. Wibert
Assistant Examiner—R. J. Webster
Attorney—Edward R. Hyde, Jr.

[57] ABSTRACT

A high-power single-frequency laser including a gain cell and an absorption cell having an absorption band corresponding to the gain band of the gain cell. Both cells are mounted within a resonant optical cavity. The absorption capacity of the absorption cell is less than the gain capacity of the gain cell but is sufficiently large so that the net self-saturation effect of an oscillatory mode within the cavity is less than the cross-saturation effect of the same oscillatory mode on other modes and, as a result, the reduction in gain at the frequency of an oscillating mode is less than the gain reduction caused by that mode at other frequencies. Tuning of the single frequency across the gain band of the laser is also a feature of this invention.

7 Claims, 4 Drawing Figures

INVENTOR.
Paul H. Lee
BY
Edward D. Murphy
ATTORNEY.

METHOD AND APPARATUS FOR PRODUCING HIGH-POWER SINGLE-FREQUENCY RADIATION

This invention relates to single-frequency lasers and is particularly directed to a strongly mode-coupled, high-power laser which emits at only one frequency.

Single-frequency lasers find a variety of applications in the fields of metrology and gaging. A major obstacle to the increased use of these devices, however, has been the fact that previous single-frequency lasers were capable of only limited power output. This limitation has been a direct result of the requirement that the laser produce its emission only at a single frequency. This is because materials which are capable of lasing can normally oscillate at any one of a continuum of frequencies within a particular band. The length of the resonant cavity within which the lasing material is placed is also significant since only radiation at a set of discrete frequencies determined by the length can oscillate. Therefore, the laser will produce emission only at the frequency for which a cavity resonance lies within the gain band of the material.

If more than one cavity resonance lies within the gain band of the material, the laser will oscillate at each of these frequencies. Since in a simple cavity the frequency spacing between resonances is inversely proportional to the length, a laser using such a cavity will oscillate at a single frequency only if it is sufficiently short so that the spacing between cavity resonances is greater than the width of the gain band of the material. If this is done, the cavity length can be tuned until one of the cavity resonances is within the gain band of the material and, since all other cavity resonances are more distant in frequency than the width of the material gain band, the laser will emit at only one frequency. However, the power output of a laser increases with increasing length of lasing material which is contained within the path of the reflected beam in the resonant cavity. Therefore, the maximum value established for length by the single-frequency requirement also establishes a maximum value on the power output available. If this maximum length value is exceeded, the total power available from the material is distributed among the various cavity resonance frequencies within the gain band of the material and, thus, the power available at any one frequency is no greater than that available from a short laser. Certain schemes have been proposed to overcome this difficulty; however, these include relatively complex cavities and tracking controls or modulation and demodulation systems. These systems are not practical for use in commercial instruments, particularly since the uses include such applications as factories, construction sites, tunneling sites, etc., where a simple and rugged construction is required. Accordingly, the purpose of the present invention is to provide a single-frequency laser which is capable of a substantially increased power output and which does not require a complex system.

It is, therefore, an object of this invention to provide a high-power single-frequency gas laser.

Another object of this invention is the provision of a method of producing high-power single-frequency coherent radiation.

It is also an object of this invention to provide a single-frequency gas laser wherein the length is not limited by the requirement of single-frequency emission.

It is also an object of this invention to provide a high-power single-frequency laser which is relatively simple and rugged in construction.

Another object of this invention is the provision of a high-power laser which exhibits strong mode-coupling.

A further object of this invention is the provision of a method of producing strong mode-coupling in a high-power laser.

Briefly, in accord with one embodiment of this invention, I provide a high-power single-frequency laser including a gain cell and an absorption cell having an absorption band corresponding to the gain band of the gain cell. Both cells are mounted within a resonant optical cavity. The absorption capacity of the absorption cell is less than the gain capacity of the gain cell but is sufficiently large so that the net self-saturation effect of an oscillatory mode within the cavity is less than the cross-saturation effect of the same oscillatory mode on other modes and, as a result, the reduction in gain at the frequency of an oscillating mode is less than the gain reduction caused by that mode at other frequencies. Tuning of the single frequency across the gain band of the laser is also a feature of this invention.

Also in accord with this invention, I provide a method of operating a laser so as to produce high power at a single frequency which includes establishing a condition within the cavity such that the reduction in gain due to cross-saturation by a given oscillatory mode of other frequencies is greater than the reduction in gain due to self-saturation by the oscillatory mode at its own frequency.

Further objects and advantages of this invention will become apparent as the description and illustration thereof proceed.

The invention, itself, will best be understood by a consideration of the following detailed specification, in conjunction with the accompanying drawings, in which.

Figure 1:
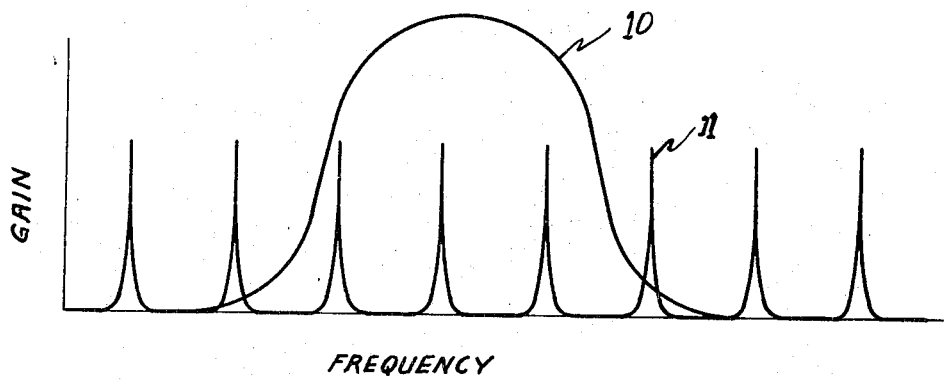
FIG. 1 is a representative curve illustrating gain as a function of frequency in a laser.

In FIG. 1, curve 10 represents a gain band of a lasing material such as helium-neon. As previously noted, the material can produce coherent radiation at any frequency within this band for which the gain of resonating radiation exceeds the losses. Superimposed on the curve 10 are peaks 11 which represent the frequencies at which the cavity is resonant. In other words, for a cavity of selected length, only a limited number of frequencies can resonate. In the situation illustrated in FIG. 1, several cavity resonances lie within the gain band of the material. If a laser is constructed in the conventional manner having this correspondence between cavity length and material gain, the laser will produce coherent emission at all or, in some circumstances, all but one of the frequencies corresponding to the cavity resonances which lie within the gain band of the material.

The frequencies at which any given cavity is resonant depend on its length. Also, the frequency difference between adjacent cavity resonances is inversely proportional to the length; thus, a long cavity has a charge number of closely spaced resonances while a short cavity has widely spaced resonances. To avoid the situation of multifrequency emission represented by FIG. 1, it has previously been necessary to limit the length of the laser so that the spacing of the cavity resonances is greater than the width of the gain band. In particular, the critical length of the cavity for a given material, at which the cavity resonance spacing just equals the bandwidth is given by the following equation:

$$W = c/2L$$

Where:
- $c$ = speed of light in meters per second,
- $L$ = cavity length in meters, and
- $W$ = width of the gain band in cycles per second at threshold Since the spacing of the cavity resonance is defined by the quantity $c/2L$, it is required in conventional lasers that this value be greater than the bandwidth; therefore, the lengths cannot be larger than the quantity $c/2W$. Thus, the power output, which is a function of length, is severely limited.

Figure 2:
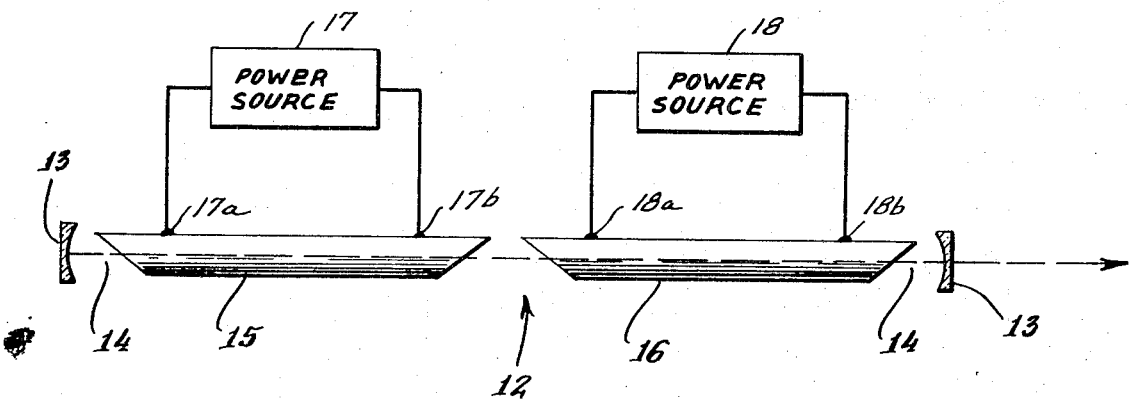
FIG. 2 is a schematic illustration of a laser constructed in accord with the present invention.

In FIG. 2, apparatus in accord with the present invention is illustrated which is capable of producing very high-power emission at a single frequency. Specifically, the laser indicated generally at 12 comprises a pair of mirrors 13 defining a resonant cavity 14 therebetween. Within the cavity, two cells 15 and 16 are provided, one of which is the gain cell of the laser while the other is an absorption cell having an absorption band substantially corresponding to the gain band of the gain cell. For example, the cell 15 may comprise a glass tube filled with a mixture of helium and neon while the cell 16 may comprise a glass tube filled with neon. In both cases, an electric discharge is established in the material by means such as power supplies 17, 18 and electrodes 17a, 17b and 18a, 18b. The type and magnitude of the discharge depend on the specific materials involved. In the case of helium-neon, a DC discharge having a current on the order of 3 ma. is suitable for the gain cell. The current in the absorption cell is, in general, somewhat lower as is described below.

The gain cell of a typical helium-neon laser may contain these gases in a ratio of about seven to one at a pressure of about 3 torr in a tube having a cross section of about 2 millimeters. The absorption cell contains only neon, since the helium serves only as an energy transfer agent and is not required for absorption, at the same or a somewhat lower pressure. It is noted, however, that any absorbing device, having an absorption band corresponding to the gain band of the gain cell, may be used.

A primary feature of this invention is the fact that the resonant cavity 14 can be made is long as desired but the emission will remain single frequency. It has previously been universally accepted that, in accord with the theory originally stated by Javan, Bennett and Herriott in Physical Review Letters, Volume 6, page 106, 1961, any gas laser having a resonant cavity sufficiently long so that more than one cavity resonance lies within the band of frequencies having gain greater than zero would be multimode. This premise has been so widely accepted that, in the interest of obtaining high-power single-frequency lasers, systems using complex cavities and tracking controls or modulation and demodulation systems have been devised. By virtue of the present invention, however, this complexity is avoided and additional power can be obtained from a single-frequency laser by simply extending the length of the resonant cavity. This feature of single-mode emission is the result of strong mode-coupling between the various resonant frequencies of the cavity which are within the gain band of the material. Strong mode-coupling is achieved due to the presence of the absorption cell in the cavity with the gain cell.

The operation of this invention is based on the establishment of a proper balance between the relative effects of the gain cell and the absorption cell. As derived by W. E. Lamb, Jr., in "The Theory of an Optical Maser," Physical Review, Volume 134A, Page 1,429, June, 1964, the energy balance equations for a normal laser oscillator are as follows:

$$E_1 = E_1[(\alpha_1 - l_1) - \beta_1 E_1 - \theta_{12} E_2] \quad (1a)$$
$$E_2 = E_2[(\alpha_2 - l_2) - \beta_2 E_2 - \theta_{21} E_1] \quad (1b)$$

where:

$\alpha_1$ and $\alpha_2$ are the linear gain coefficients for the respective modes;

$l_1$ and $l_2$ are the cavity loss factors;

$\beta_1$ and $\beta_2$ are the self-saturation loss terms;

$\theta_{12}$ and $\theta_{21}$ are the cross-saturation loss terms; and $E_1$ and $E_2$ are the electromagnetic energy of the modes.

These equations are stated for two-mode operation; the more general case is represented between a matrix of equations.

It is known, on the basis of the theory presented by Lamb, that the product of the self-saturation terms is greater than the product of the cross-saturation terms. The effect of this inequality is to produce weak mode-coupling. In other words, since the gain reduction at an operating wavelength due to self-saturation is substantially greater than the gain reduction at other wavelengths due to cross-saturation, other wavelengths can oscillate in the same cavity. This is the situation which occurs in the conventional long laser which produces multimode operation.

In accord with this invention, it has been found that the addition of an absorption cell having an absorption capacity which is smaller than, but not insignificant compared to the gain capacity of the gain cell, produces strong-mode coupling, and thus produces single-mode operation. The energy balance equations for the oscillator, including both gain cell and absorption cell, are as follows:

$$E_1 = E_1[(\alpha_1 - a_1 - l_1) - (\beta_1 - b_1) E_1 - (\theta_{12} - t_{12}) E_2] \quad (2a)$$
$$E_2 = E_2[(\alpha_2 - a_2 - l_2) - (\beta_2 - b_2) E_2 - (\theta_{21} - t_{21}) E_1] \quad (2b)$$

where:

$a_1$ and $a_2$ are the linear loss coefficients of the absorption cell;

$b_1$ and $b_2$ are the self-saturation coefficients of the absorption cell; and $t_{12}$ and $t_{21}$ are the cross-saturation coefficients of the absorption cell.

The condition for single-frequency operation in accord with the present invention is then given by the following:

$$(\beta_1 - b_1)(\beta_2 - b_2) < (\theta_{12} - t_{12})(\theta_{21} - t_{21}) \quad (3)$$

Figure 3A:
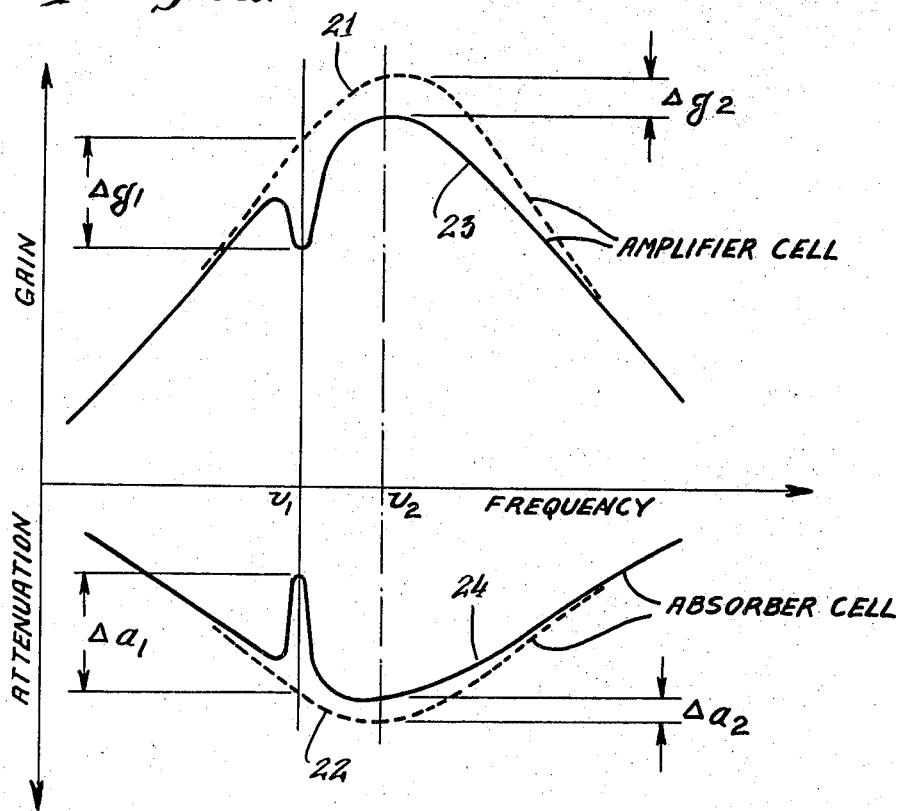
FIGS. 3a and 3b are curves representing the output obtained from a specific laser operated, respectively, without and with the improved construction of the present invention.
Figure 3B:
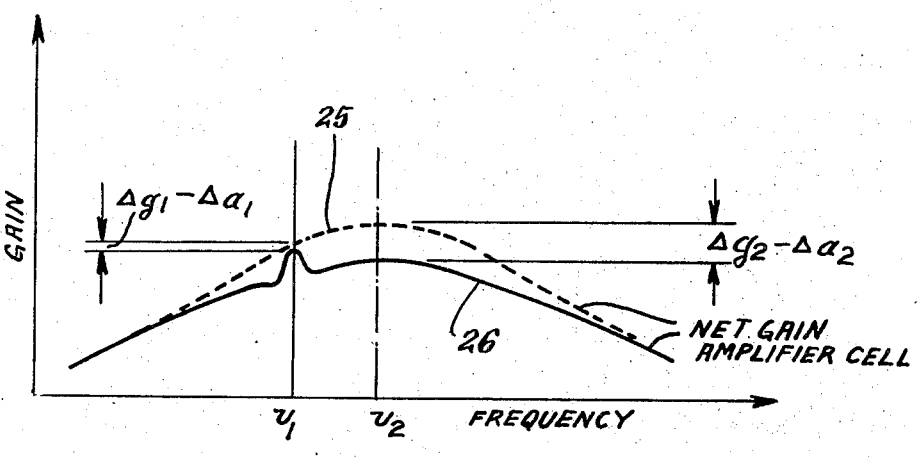

FIGS. 3a and 3b illustrate the effect of these concepts on the output of a given oscillator. In FIG. 3a the dashed line curves 21 and 22 represent the gain and absorption, respectively, of the cells as a function of frequency in the absence of any oscillation. As soon as oscillation occurs, for example, at a frequency $\nu_1$, the capacities of the cells are reduced as indicated by the solid curves 23 and 24. In the conventional laser oscillator, the reduction in gain $\Delta g_1$ at the frequency $\nu_1$, is proportional to the product $\beta_1 \beta_2$ while the reduction in gain at other frequencies, such as $\Delta g_2$ at frequency $\nu_2$ is proportional to the product $\theta_{12} \theta_{21}$. As illustrated, the product of the self-saturation terms is always greater than the product of the cross-saturation terms. Similarly, in an absorption cell, the reduction $\Delta a_1$ of the absorption at frequency $\nu_1$, is greater than that, $\Delta a_2$, at frequency $\nu_2$.

In accord with the present invention, the oscillator includes an absorption cell so that its output curve 26 is the sum of the curves 23 and 24, as shown in FIG. 3b. In this case, $\Delta g_1 - \Delta a_1$ is almost 0 while $\Delta g_2 - \Delta a_2$ is greater; thus for the cavity, the product of the cross-saturation terms is greater than that of the self-saturation terms. The effect of this condition is that the oscillatory mode nearest the center of the net gain curve 25, and which is therefore maximized, reduces the relative gain available for other frequencies. The combination of the effects of self-enhancement and of the reduction of other frequencies quickly produces a condition known as saturation in the absorption cell at the enhanced frequency. This is a condition in which so many particles in the absorption cell have absorbed radiation at the enhanced frequency that the number of particles returning to the absorbing state is always equal to or greater than the number which will absorb in a given interval of time. Thus, for example, the absorbing material has become transparent at this frequency (since it is continuously emitting as much radiation at this frequency as it can absorb) and no further absorption occurs. Thus, the gain at this frequency suddenly increases substantially relative to the gain at all other frequencies.

At the same time, the other frequencies which have been suppressed between reduced net gain available are continuously being further suppressed by absorption in the absorption cell. In fact, all the above happens within a very short interval of time after the excitation is applied. Thereafter, the laser emits at a single frequency.

The reduction in gain or absorption caused by self-saturation or cross saturation at any given wavelength are functions of the material in the gain cell and of the unsaturated gain curve for these materials. Accordingly, to adjust the parameters to meet the conditions stated mathematically above, it is only necessary to adjust the absorption capacity of the absorption cell until single frequency emission is achieved. In practice, therefore, a laser designed in accord with the present invention may be made by the successive steps of providing a gain cell large enough to supply the desired power, providing an absorption cell approximately 10 to 20 percent as long as the gain cell, placing the cells in a resonant cavity and applying excitation thereto, and adjusting the pressure or current in the absorption cell until the output oscillation is single frequency.

A further consequence of laser operation in accord with the conditions defined above is that, although the laser initially selects an oscillatory mode which lies near the center of the gain band, after single-frequency operation is established, the laser may be tuned by shifting the position of one or the other of the end mirrors of the resonant cavity. In other words, due to the large gain difference between the mode in which the laser is oscillating and all other possible modes, one of the mirrors of the laser may be moved so as to change the cavity length and thus change the frequency at which the laser is oscillating. In fact, it has been found that this movement may be sufficient to scan the single emission frequency over the entire gain band of the material without destroying the single emission capability. Thus, once single-frequency emission is established, the output may be changed to any other value within the gain band of the material so that the advantage of high-power single-frequency emission can be provided over a wide band of frequency.

It is noted that, although the present invention has been described in connection with a gas laser having an absorption cell of the corresponding gas, it is actually much more broadly applicable. For example, an absorption cell which has an absorption band corresponding to the gain band of the lasing material may be used. More specifically, solid material lasers such as those using neodymium glass and yttrium-aluminum-garnet (YAG) lasers may be constructed in accord with the present invention by providing absorption cells using suitable dyes which have absorption bands corresponding to the gain bands of the respective solid materials. Furthermore, this invention is applicable to overcome the present limitation on the diameter of lasers. Specifically, an absorption cell meeting the conditions given above and having a diameter corresponding to that of a large-gain cell and large-diameter absorption cell. Adjustment of the degree of absorption of this cell could then be used to prevent second and third order transverse modes from arising in the laser.

In general, the present invention is directed to the use of an absorption cell having an absorptivity such that the self-saturation due to the presence of an oscillatory mode reduces the gain at the frequency of that mode by only a small amount while greatly reducing the gain through cross saturation at other frequencies. In accord with the discussion above, the enhanced gain at this mode and the simultaneous reduction of gain at other modes quickly overcomes the absorption capacity of the absorption cell at the frequency of the oscillating mode so that, in effect, the absorption cell becomes transparent to that frequency and simultaneously suppresses other modes which try to propagate. While certain specific embodiments of this invention have been described above, it is intended that the appended claims cover all changes and modifications as may come between the true spirit and scope of this invention.

We claim:

1. A laser for producing high-power radiation at a single-frequency comprising:
    means defining a resonant optical cavity;
    a gain cell containing a first active material extending within said cavity for producing stimulated emission of radiation;
    means for exciting said first material;
    the length of said resonant cavity along the optical axis thereof being sufficient so that said cavity is resonant at a plurality of frequencies within a characteristic gain band of said material;
    an absorption cell containing a second active material extending within said cavity for producing stimulated emission of radiation, said second material having an absorption region corresponding to said gain band of said first material, said absorption cell being from about 10 to about 20 percent as long as the gain cell;
    means for exciting said first material;
    the absorption capacity of the absorption cell being less than the gain capacity of the gain cell, but sufficiently large so that the net self-saturation effect of an oscillatory mode within the cavity is less than the cross-saturation effect of the same oscillatory mode on other modes in conformance with the following condition:

$$(\beta_1-b_1)(\beta_2-b_2)<(\theta_{12}-t_{12})(\theta_{21}-t_{21})$$

wherein:
    $\beta_1$ and $\beta_2$ are the self-saturation energy loss coefficients of said first material;
    $b_1$ and $b_2$ are the self-saturation energy loss coefficients of said second material;
    $\theta_{12}$ and $\theta_{21}$ are the cross-saturation energy loss coefficients of said first material; and
    $t_{12}$ and $t_{21}$ are the cross-saturation energy loss coefficients of said second material.

2. A laser as claimed in claim 1 wherein said first material comprises a gas.

3. A laser as claimed in claim 1 wherein said second material comprises a gas having energy levels corresponding in part to those of said first material to provide said corresponding absorption region.

4. A laser as claimed in claim 1 wherein said first material comprises a mixture of helium and neon and wherein said second material comprises neon.

5. A laser as claimed in claim 1 and further comprising means for changing the length of said cavity so that, after initiation of said oscillation, the frequency of said oscillation can be adjusted to another value within said gain band.

6. A method of producing high-power single-frequency radiation from a laser which includes a gain cell and a resonant optical cavity of a length sufficient to produce a high-power output, said length also being sufficient so that a plurality of cavity resonant frequencies lie within the gain band of said cell, which comprises the steps of:
    providing an absorption cell within said cavity having an absorption band corresponding to the gain band of said gain cell and having an absorption capacity less than the gain capacity of the gain cell but sufficiently large so that the net self-saturation effect of an oscillatory mode within the resonant cavity is less than the cross-saturation effect of the same oscillatory mode on other modes;
    exciting said gain cell to produce emission;
    exciting the absorption cell to produce emission; and;
    adjusting said absorption cell until the self- and cross-saturation effects within said cavity meet the following condition:

$$(\beta_1-b_1)(\beta_2-b_2)<(\theta_{12}-t_{12})(\theta_{21}-t_{21})$$

wherein:
    $\beta_1$ and $\beta_2$ are the self-saturation energy loss coefficients of said gain cell;
    $b_1$ and $b_2$ are the self-saturation energy loss coefficients of said absorption cell;
    $\theta_{12}$ and $\theta_{21}$ are the cross-saturation energy loss coefficients of said gain cell; and
    $t_{12}$ and $t_{21}$ are the cross-saturation energy loss coefficients of said absorption cell.

7. The method of producing high-power single-frequency radiation as claimed in claim 6 and comprising the further step of adjusting the length of said cavity after establishment of a single-frequency oscillatory mode within said cavity so as to adjust the frequency of said mode within the gain band of said gain cell.

* * * * *